United States Patent [19]
Schulte

[11] Patent Number: 4,804,306
[45] Date of Patent: Feb. 14, 1989

[54] MACHINE FOR TRANSPOSING OF ARTICLES, PARTICULARLY FOR UNLOADING OF PALLETS CARRYING CONTAINERS

[75] Inventor: Lothar Schulte, Dortmund, Fed. Rep. of Germany

[73] Assignee: H&K Verpackungstechnik GmbH, Dortmund, Fed. Rep. of Germany

[21] Appl. No.: 185,376

[22] Filed: Apr. 22, 1988

Related U.S. Application Data

[63] Continuation-in-part of Ser. No. 892,581, Aug. 1, 1986, abandoned.

[30] Foreign Application Priority Data

Aug. 2, 1985 [DE] Fed. Rep. of Germany ....... 3527746

[51] Int. Cl.⁴ .............................................. B65G 59/02
[52] U.S. Cl. .................................... 414/120; 414/114; 414/121; 414/626; 414/627; 414/751; 414/744.8
[58] Field of Search ............... 414/114, 121, 122, 120, 414/626, 627, 744 A, 744 B, 751, 752, 753, 917

[56] References Cited
U.S. PATENT DOCUMENTS

| Re. 32,081 | 2/1986 | Soros | 414/139 |
|---|---|---|---|
| 3,180,506 | 4/1965 | Moskopf et al. | 294/104 |
| 4,102,284 | 7/1978 | Rohr | 414/917 X |
| 4,493,599 | 1/1985 | Hartness et al. | 414/120 |

FOREIGN PATENT DOCUMENTS

| 60-56728 | 4/1985 | Japan | 414/114 |
|---|---|---|---|
| 1162532 | 6/1985 | U.S.S.R. | 414/917 |

Primary Examiner—Robert J. Spar
Assistant Examiner—Janice Krizek
Attorney, Agent, or Firm—Toren, McGeady & Associates

[57] ABSTRACT

These machines have the task to separate the containers stacked on the pallet as well as the intermediate bottoms provided for stabilization from each other. For this purpose additional devices are provided which are intended exclusively for the extraction and transportation of these intermediate bottoms. Now an essential simplification is to be accomplished, so that the extraction of the containers and the removal of the intermediate bottoms occurs automatically with the transposal movement of the container layer. For this purpose it is proposed in the invention that a parallel crank linkage 4,5 is provided as transposal device 3 and that one crank rod 4 includes the gripper device 9 for the container layer 10 and the second crank rod 5 includes the extraction device 13 for the stabilization bottom 16, both of the them being adjustable in height and that at least one device 9,13 is movable in a straight line counter to the curved path by the curved movement in the course of displacement from the one to the other position.

3 Claims, 1 Drawing Sheet

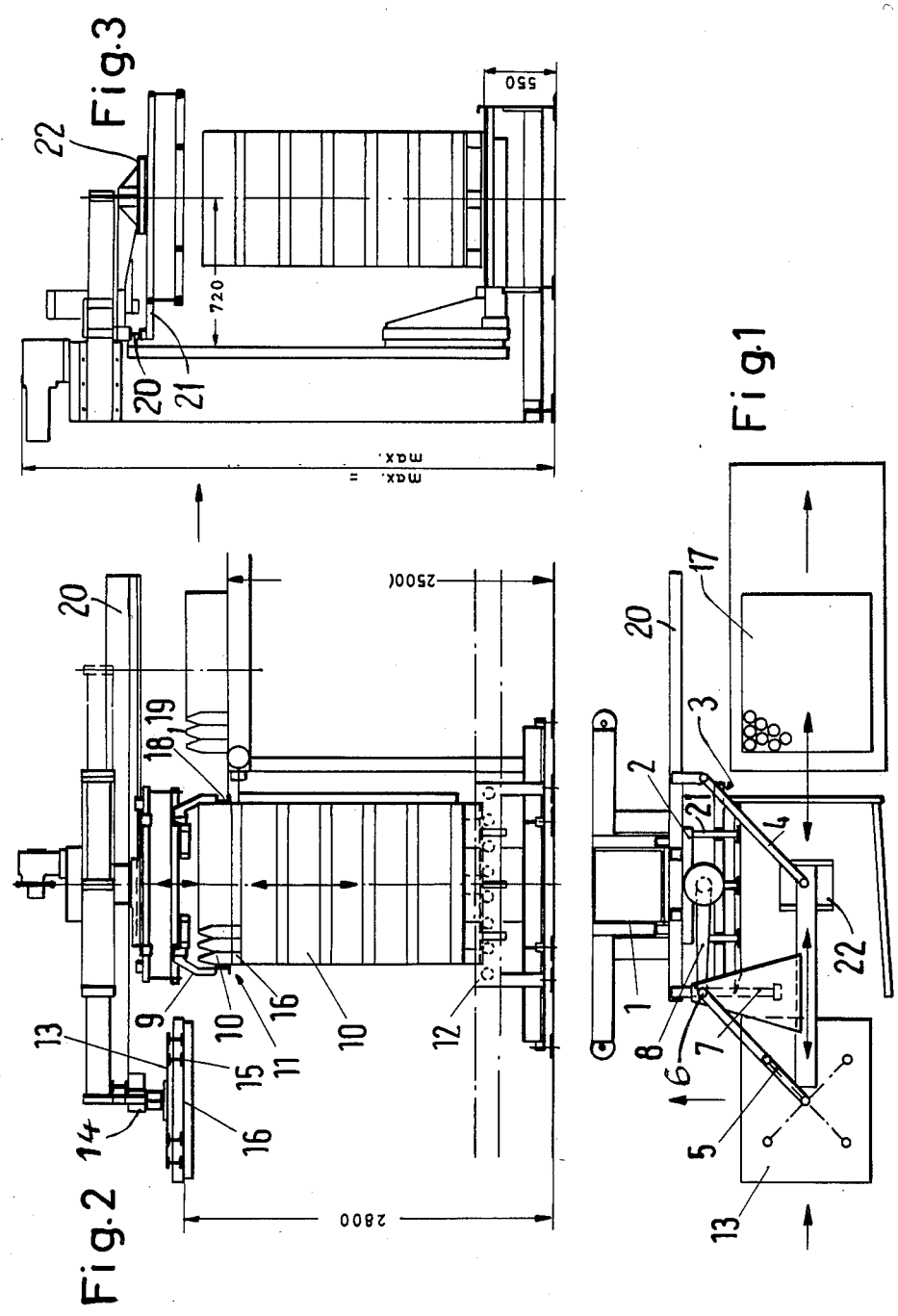

MACHINE FOR TRANSPOSING OF ARTICLES, PARTICULARLY FOR UNLOADING OF PALLETS CARRYING CONTAINERS

This is a continuation-in-part of application Ser. No. 06/892,581, filed Aug. 1, 1986, now abandoned.

BACKGROUND OF THE INVENTION

The invention is directed to a machine for the transposing of articles such as unloading containers, stacked in layers on a pallet, onto a depositing plane.

The task of these machines is to separate on the one hand the containers stacked in layers on the pallets from the intermediate bottoms provided for stabilization and on the other hand to transpose them to the respective stations. It is known in this connection to provide a second device in addition to the unloading function of the depalletizing machine, which is exclusively provided for the extraction and conveyance away of the stabilization bottoms. In this case special driving devices as well as separate supports for this additional device are required.

SUMMARY OF THE INVENTION

Proceeding from this known device the primary object of the invention is to create an essential simplification here and to take care that the extraction of the containers and the subsequent required removal of the stabilization bottoms occurs automatically with the transposal movements of the container layers, so that no separate driving device and support unit is required.

This task is solved in accordance with the invention in a device of the previously mentioned type in that a parallel crank linkage constituting the transposing arrangement is provided and one crank comprises the gripping device for the container layers and the second crank the stabilization bottom removal device, both to be adjustable in height, and that at least one of them is able to move in a straight line counter to the curved path defined by the crank movement in the course of moving from one to the other end position.

With this embodiment it is possible in accordance with the defined task to allow the depalletizing machine to repeatedly cycle back and forth, wherein during the depositing of the just gripped container layer the removal of the stabilization bottom still contained on the pallet occurs automatically. The stabilization bottom is gripped and slightly lifted, so that during the return travel of the container layer transposing device the just gripped stabilization bottom can be deposited in its collecting station and can be removed. Hereby the device for transposing the container layer moves, in spite of the pivoting movement of the parallel crank linkage, along a straight line movement path, which has the advantage that the depositing plane proper for receiving and transporting away the container layers can be arranged directly next to the extraction station, which has an advantageous effect on the overall output of the machine because of the short cycle times resulting therefrom.

Other characteristics of the invention can be discerned from the subclaims.

In the following the invention is described with particularity with the help of an embodiment example depicted in a simplified manner in the drawing.

BRIEF DESCRIPTION OF THE DRAWING

It is shown on:
FIG. 1 is a simplified plan view of the device;
FIG. 2 is a front view also depicted in simplified form; and
FIG. 3 a side view of the device in simplified form.

DETAILED DESCRIPTION OF THE PREFERRED EMBODIMENT

According to the embodiment example illustrated in FIG. 2 the machine consists of a conventional depalletizing machine as a single column machine 1 at which the elevating device 2 proper is supported to be intermittently displaceable in the vertical direction. At this lifting device 2 the transposing device 3 proper is attached, which consists of a parallel crank linkage 4, 5 which is connected by an articulation 6. This articulation 6 carries a control rod 7 at which engages a crank drive 8, which is pivotable practically throughout 180° and thereby determines the respective end positions. In the embodiment shown a gripping device 9 for the container layers 10 to be transposed is located at the end of the parallel crank rod 4 in the area of the extraction plane 11 above the pallet emplacement 12. A stabilization bottom removal or extraction device 113 is fastened additionally at the end of the parallel crank rod 5, which is to a slight extent movable up and down in a vertical plane by means of an adjustment arrangement 14. In addition the extraction device 13 exhibits several vacuum actuated suction cups 15 for extraction of a stabilizing bottom 16. A depositing plane 17 is arranged next to the pallet emplacement 12 and the extraction plane 11, upon which the completely gripped container layers 10 are deposited and subsequently transported away.

According to the embodiment example illustrated in the FIG. 2 the gripping device 9 with the gripping unit 18 embracing the container layers on all sides is in gripping position and extracts herein the respectively upper container layer 10. The container layer 10 is located as can be discerned from FIG. 2 with gripping elements 19 of the gripping unit 18 slightly above the stabilization bottom 16 carrying the containers 10. As soon as the clamping elements 19 have been moved against the container layer 10 by means of the adjustment device, the complete container layer 10 is gripped and transposed through pivoting of the parallel crank linkage 4,5 into the area of the depositing plane 17. The movement path of the gripping device 9 is here in a straight line. For this purpose this gripping device 9 is displaceably supported inside of the parallel crank linkage and retained at a straight line guidance rod arranged at the lifting device 2. The rail 20 is fixed to the gripping device 9 by rods 21. One end of the crank rod 4 is pivotally connected to the rail 20 while its opposite end is fixed to a slide guide 22 secured to the gripping device. As the crank rod 4 pivots, the slide guide 22 transforms the pivoted movement into straight line movement along rail 20. Hereby the desired straight line motion in direction of the depositing plane 17 is achieved counter to the circularly-shaped movement path of the end point of the parallel crank rod 4. During the transposal process the extraction unit 13 for the stabilization bottoms moves automatically along the circular path predetermined by the parallel crank linkage 5 and hereby arrives at the pallet emplacement 12 with the end position of the gripping device 9 above the depositing plane 17, in order in this position to grip the stabilization bottom 16 still located upon the pallet by lowering of the suction cups 15. As soon as said stabilization bottom is gripped, the extraction device 13 is slightly lifted, as well as the gripping arrangement 18 so that now both devices can be moved back into their original position. As soon as the gripping device 9 has reached the pallet emplacement 12 a container layer can again be gripped. At the same time the extraction device 13 also reaches its end position and releases the stabilization bottom for being transported away. This process is repeated until the pallet involved is unloaded.

I claim:

1. Machine for the movement of containers from an unloading station to a depositing station spaced horizontally from the unloading station with the unloading station arranged to receive a pallet containing containers stacked in layers one above the other with a stabilization bottom located between each layer, comprising a transposing device (3) for moving the container layers from the unloading station to the depositing station; said transposing device includes a horizontally arranged parallel crank linkage (4, 5) comprising an elongated first crank rod (4) and an elongated second crank rod (5) disposed parallel to said first crank rod (4) and means for pivotally displacing said first and second crank rods as a unit between a first position and a second position, each said first and second crank rod has a first end connected to said pivot means and a second end, the second end of said first and second crank rods move along an arcuate path when displaced by said pivot means between the first and second positions, a gripper device (9) secured to the second end of said first crank rod (4) and arranged to grip a layer of containers, an extraction device (13) secured to the second end of said second crank rod (5), sliding means (22) connecting said gripper device (9) on the second end of said first rod for moving said gripper device along a straight path from the first position above the unloading station to the second position above the depositing station while the extraction device (13) on the second end of said second crank rod (5) is movable along an arcuate path from the first position located on the opposite side of the unloading station from said depositing station and the second position located above the unloading station, and said gripping device (9) and said extraction device (13) being vertically displaceable.

2. Machine, as set forth in claim 1, wherein said gripper device (9) includes gripping elements (19) for laterally enclosing a layer of the containers.

3. Machine, as set forth in claim 1, wherein said extraction device (13) comprises a plurality of laterally spaced vacuum actuated suction cups (15) for removing a stabilization bottom from the unloading station after the removal of a layer of containers.

* * * * *